United States Patent
Matthews et al.

(10) Patent No.: US 9,613,426 B2
(45) Date of Patent: Apr. 4, 2017

(54) SEGMENTATION AND MATCHING OF STRUCTURES IN MEDICAL IMAGING DATA

(71) Applicant: Toshiba Medical Systems Corporation, Otawara-shi (JP)

(72) Inventors: James Matthews, Edinburgh (GB); Marco Razeto, Edinburgh (GB); Qiulin Tang, Mundelein, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 53 days.

(21) Appl. No.: 14/519,564

(22) Filed: Oct. 21, 2014

(65) Prior Publication Data

US 2016/0110874 A1  Apr. 21, 2016

(51) Int. Cl.
*G06K 7/00* (2006.01)
*G06T 7/00* (2017.01)
*G06T 11/60* (2006.01)
*G06T 11/20* (2006.01)

(52) U.S. Cl.
CPC .......... *G06T 7/0081* (2013.01); *G06T 7/0097* (2013.01); *G06T 11/203* (2013.01); *G06T 11/60* (2013.01); *G06T 2207/10081* (2013.01); *G06T 2207/30048* (2013.01); *G06T 2207/30101* (2013.01)

(58) Field of Classification Search
CPC ..... G06T 7/0081; G06T 11/203; G06T 11/60; G06T 2207/10081
USPC ......................................................... 382/131
See application file for complete search history.

(56) References Cited

U.S. PATENT DOCUMENTS

| 8,638,999 B2 | 1/2014 | Xu et al. | |
|---|---|---|---|
| 2008/0221442 A1* | 9/2008 | Tolkowsky | A61B 6/5217 600/425 |
| 2009/0220050 A1* | 9/2009 | Guhring | A61B 5/055 378/98.5 |
| 2010/0260396 A1* | 10/2010 | Brandt | G06K 9/4671 382/131 |
| 2010/0272315 A1* | 10/2010 | Tsin | G06T 7/2046 382/103 |
| 2011/0085701 A1* | 4/2011 | Kitamura | G06K 9/469 382/103 |

(Continued)

FOREIGN PATENT DOCUMENTS

NL   EP 1702302 B1 *  2/2008  ........... G06T 7/0081

OTHER PUBLICATIONS

U.S. Appl. No. 14/048,170, filed Oct. 8, 2013, Razeto, et al.

(Continued)

*Primary Examiner* — Siamak Harandi
*Assistant Examiner* — Amandeep Saini
(74) *Attorney, Agent, or Firm* — Oblon, McClelland, Maier & Neustadt, L.L.P.

(57) ABSTRACT

A medical image processing apparatus for receiving a target phase data set and a reference phase data set at different times, obtaining a segmentation of an elongated structure in the target phase data and the reference phase data set, determining a target phase line along the segmentation of the elongated structure in the target phase data set and a reference phase line along the segmentation of the elongated structure in the reference phase data set, and determining a synthesized target phase line by combining the target phase line and reference phase line.

19 Claims, 14 Drawing Sheets

(56) References Cited

U.S. PATENT DOCUMENTS

2013/0077841 A1* 3/2013 Wu ............... G06K 9/6207
382/131

OTHER PUBLICATIONS

Roshni Bhagalia, et al., "Bi-Directional Labeled Point Matching" Biomedical Imaging: From Nano to Marco, IEEE International Symposium, 2010, pp. 380-383.

Qiulin Tang, et al., "A combined local and global motion estimation and compensation method for cardiac CT" Medical Imaging 2014: Physics of Medical Imaging, 903304, Mar. 2014, 6 pages.

Roshni Bhagalia, et al., "Nonrigid registration-based coronary artery motion correction for cardiac computed tomography" Medical Physics, vol. 39, No. 7, 2012, pp. 4245-4254, Jan. 2012.

David Dowe, et al., "SnapShot Freeze Motin-corrected CCTA: CT clinical case study-cardiac CT" GE Healthcare, 2012, 2 pages.

Maria Iatrou, et al., "Coronary Artery Motion Estimation and Compensation: a Feasibility Study" IEEE Nuclear Science Symposium Conference Record, 2010, pp. 2819-2821, Nov. 2010.

Pedro Augusto Gondim Teixeira, MD, et al., "Bone Marrow Edema Pattern Identification in Patients With Lytic Bone Lesions Using Digital Subtraction Angiography-Like Bone Subtraction on Large-Area Detector Computer Tomography" Investigative Radiology, vol. 49, No. 3, Mar. 2014, pp. 156-164.

W. Lenz, "Beitrag zum Verständnis der magnetischen Erscheinungen in festen Körpern" Physikalische Zeitschrift, vol. 21, 1920, 2 pages.

Y. Hu, et al., "Simulated Annealing and Iterated Conditional Modes with Selective and Confidence Enhanced Update Schemes" Computer-Based Medical Systems, 1992, pp. 257-264.

Barry A. Cipra, "An Introduction to the Ising Model" American Mathematical Monthly, vol. 94, No. 10, 1987, pp. 937-959.

Stan Z. Li, "2. Mathematical MRF Models" Markov Random Field Modelling in Image Analysis, 2009, pp. 31-33.

S. Murphy, et al., "Multi-compartment heart segmentation in CT angiography using a spatially varying Gaussian classifier" International Journal of Computer Assisted Radiology and Surgery, vol. 7, No. 6, 2012, pp. 829-836, Jan. 2012.

Lifeng Yu, PhD, et al., "Image Reconstruction Techniques" American College of Radiology, http://www.imagewisely.org/Imaging-Modalities/Computed-Tomography/Medical-Physicists/Articles/Image-Reconstruction-Techniques, Nov. 2010, 3 pages.

* cited by examiner

SEGMENTATION AND MATCHING OF STRUCTURES IN MEDICAL IMAGING DATA

FIELD

Embodiments described herein relate generally to a method of, and apparatus for, segmentation and matching of structures in medical imaging. Embodiments have, for example, application to automatic segmentation and matching of blood vessels or other elongated structures.

BACKGROUND

Image quality in CT scans of the heart may be affected by heart motion. Motion of the heart within the duration of a cardiac CT scan capture may result in the presence of motion artifacts in images derived from the cardiac CT scan.

FIG. 1 shows an image derived from a CT scan of the heart. Ellipses 2 indicate vessels with severe motion artifacts. Normally, in an image derived from a scan without significant motion artifacts, it may be expected that vessels would appear as approximately circular. However in FIG. 1 the vessels within ellipses 2 are significantly distorted.

Heart motion may particularly affect image quality in scans that are taken at high heart rates, for example heart rates over 60 beats per minute (bpm). Advanced scanners may obtain good image quality with moderately high heart rates, but may still see decreased quality at higher heart rates.

The range of patients for whom good quality cardiac CT scans may be obtained may in some circumstances be limited to patients who do not have high heart rates during the cardiac CT scan. For some patients, drugs such as beta-blockers may be administered to slow the patient's heart rate, for example to slow the patient's heart rate below 60 beats per minute. However, some patients may be unable to take beta-blockers, for example due to medical conditions. If good image quality at higher heart rates could be obtained, the number of patients who could benefit from good quality cardiac CT scans may be increased.

Some existing methods attempt to improve the quality of cardiac scans by capturing data over more than one heart beat. However, capturing data over more than one heart beat may increase the length of the CT scan and increase the radiation dose to the patient.

It is known to estimate heart motion by comparing scan data that is representative of different points in time, to determine the motion that has occurred between the different time points.

BRIEF DESCRIPTION OF THE DRAWINGS

Embodiments are now described, by way of non-limiting example, and are illustrated in the following figures, in which.

DETAILED DESCRIPTION

Certain embodiments provide a medical imaging data processing apparatus, comprising a data receiving unit configured to receive a target phase data set and a reference phase data set, wherein the target phase data set and the reference phase data set are representative of a region of a patient at different times, a segmentation unit configured to obtain a segmentation of an elongated structure in the target phase data set and to obtain a segmentation of the elongated structure in the reference phase data set, a line determination unit configured to determine a target phase line along the segmentation of the elongated structure in the target phase data set and to determine a reference phase line along the segmentation of the elongated structure in the reference phase data set and a synthesis unit configured to determine a synthesized target phase line by combining at least part of the target phase line and at least part of the reference phase line.

Certain embodiments provide a medical imaging data processing method, comprising receiving a target phase data set and a reference phase data set, wherein the target phase data set and the reference phase data set are representative of a region of a patient at different times, obtaining a segmentation of an elongated structure in the target phase data set and obtaining a segmentation of the elongated structure in the reference phase data set, determining a target phase line along the segmentation of the elongated structure in the target phase data set and determining a reference phase line along the segmentation of the elongated structure in the reference phase data set, and determining a synthesized target phase line by combining the target phase line and reference phase line.

Figure 1:
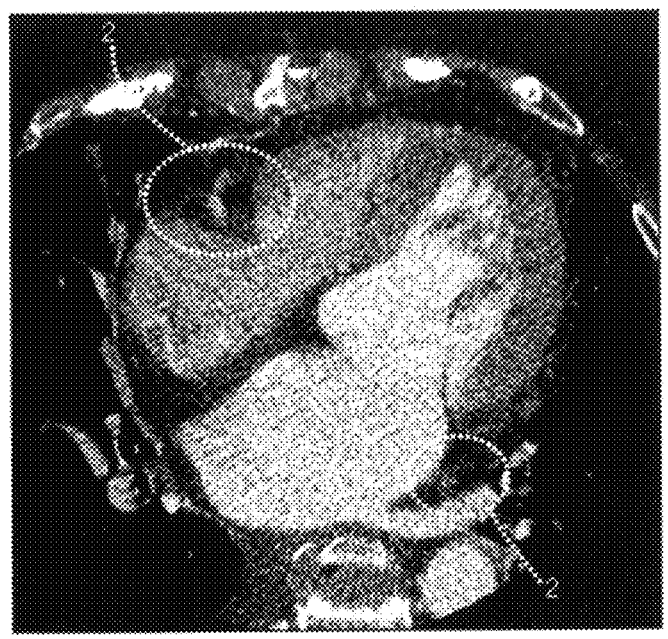
FIG. 1 is a cardiac CT image exhibiting motion artifacts.
Figure 2:
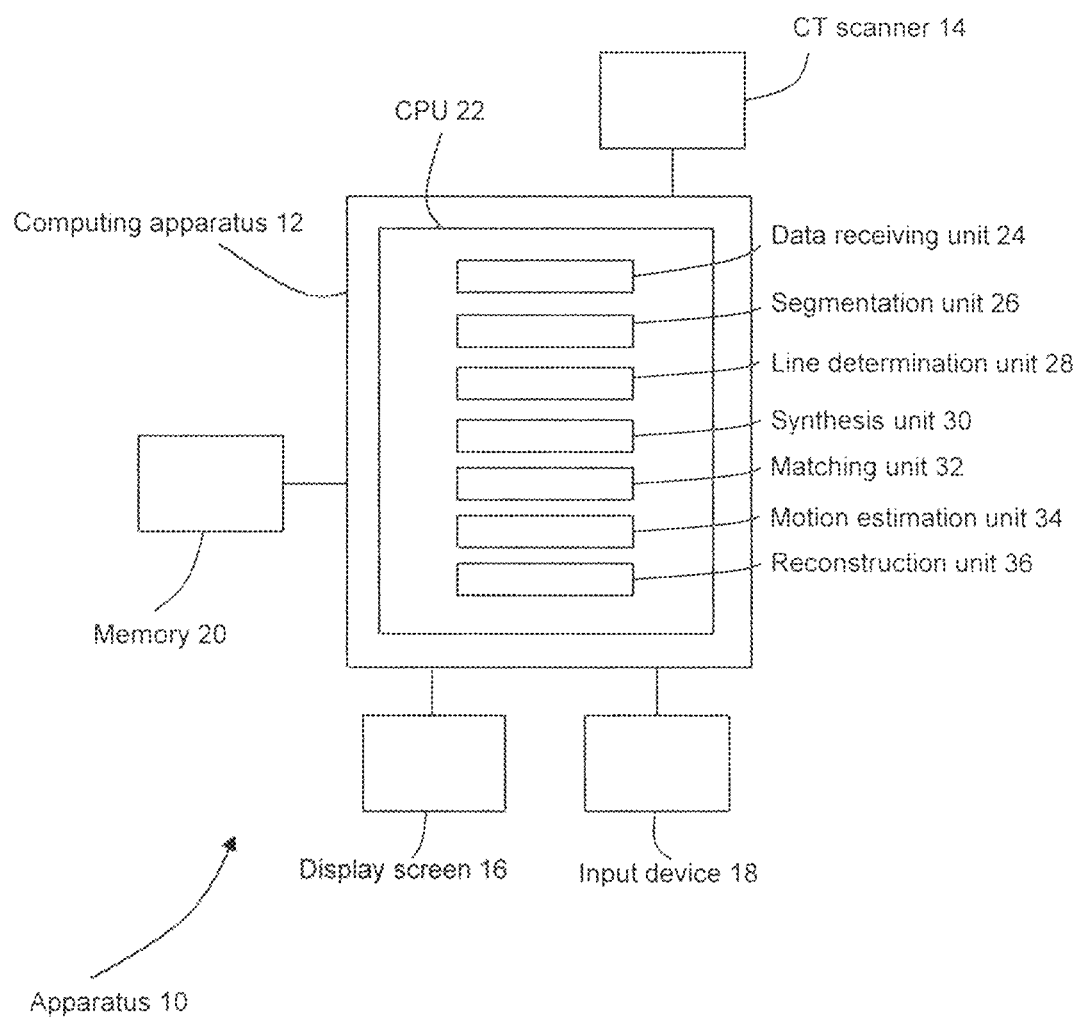
FIG. 2 is a schematic illustration of an apparatus according to an embodiment.

An imaging data processing apparatus 10 according to an embodiment is illustrated schematically in FIG. 2. The imaging data processing apparatus 10 comprises a computing apparatus 12, for example, a personal computer (PC) or workstation, which is connected to a CT scanner 14, one or more display screens 16 and an input device or devices 18, such as a computer keyboard, mouse or trackball.

The CT scanner 14 may be any CT scanner that is configured to obtain volumetric CT data of a region of a patient. In the present embodiment, the region of the patient is the heart. In other embodiments, the region of the patient may be any appropriate region, for example any organ. The region of the patient may be, for example, a lung or liver. The volumetric CT data of the region of the patient may be reconstructed into one or more volumetric imaging data sets suitable for image processing.

In alternative embodiments, the CT scanner 14 may be replaced or supplemented by a scanner in any other imaging modality, for example an MRI (magnetic resonance imaging) scanner, X-ray scanner, PET scanner (positron emission tomography), SPECT (single photon emission computed tomography) scanner, or ultrasound scanner.

In the present embodiment, volumetric CT data sets obtained by the CT scanner 14 are stored in memory 20 and subsequently provided to computing apparatus 12. In the description below, the term volumetric CT data set is used to refer to raw (unreconstructed) data as may be received from a scanner, and the term volumetric imaging data set is used to refer to reconstructed data, for example a three dimensional array of voxels with each voxel being representative of a corresponding location in a scanned volume. In an alternative embodiment, volumetric CT data sets are supplied from a remote data store (not shown) which may form part of a Picture Archiving and Communication System (PACS). The memory 20 or remote data store may comprise any suitable form of memory storage.

Computing apparatus 12 provides a processing resource for automatically or semi-automatically processing imaging data sets, and comprises a central processing unit (CPU) 22.

The computing apparatus 12 includes a data receiving unit 24 for receiving data, a segmentation unit 26 for segmenting at least one structure from imaging data, a line determination unit 28 for determining lines along segmented structures and a synthesis unit 30 for synthesizing a line using lines from multiple data sets. In the present embodiment, the computing apparatus 12 also includes a matching unit 32 for matching lines, a motion estimation unit 34 for estimating motion, and a reconstruction unit 36 for reconstructing volumetric image data sets from volumetric CT data.

In the present embodiment, the units are each implemented in computing apparatus 12 by means of a computer program having computer-readable instructions that are executable to perform the method of the embodiment. For example, each unit may be implemented as a respective computer program or algorithm that is executable by the computing apparatus 12, for example by the CPU 22. However, in other embodiments, the various units may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 2 for clarity.

The system of FIG. 2 is configured to perform the method of an embodiment as described below with reference to FIG. 3.

Figure 3:
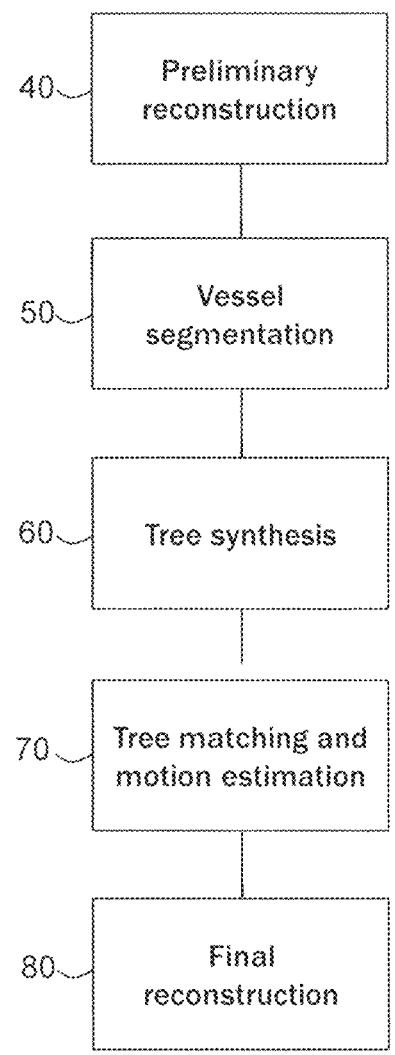
FIG. 3 is a flow chart illustrating in overview a process performed in accordance with an embodiment.

FIG. 3 is a flow chart showing in overview the method of an embodiment. In the embodiment of FIG. 3, volumetric CT scan data is reconstructed into multiple preliminary volumetric imaging data sets (each representative of a different point in time) and the coronary arteries are automatically segmented from each of the preliminary volumetric imaging data sets. The segmentation of the coronary arteries is incomplete due to motion artifacts in the volumetric CT scan data. Centerlines are obtained for the segmentation of the coronary arteries in each of the preliminary volumetric imaging data sets and the centerlines are combined to determine a synthesized target phase line which is representative of the coronary arteries at a target time, and is more complete than any of the individual centerlines. The motion that occurred during the volumetric CT scan is estimated by comparing individual centerlines to the synthesized target phase line. The estimated motion is used to reconstruct a data set in which motion artifacts are reduced.

The embodiment of FIG. 3 is described in overview below. Following the description in overview, various stages in the process of FIG. 3 are described in greater detail with reference to FIGS. 4 to 15.

At stage 40 of the flow chart of FIG. 3, the reconstruction unit 36 receives a volumetric CT data set from the CT scanner 14 (or from a data store, for example a remote data store). The volumetric CT data set comprises raw CT data from a scan performed on the CT scanner. For example, the raw CT data may be representative of voltage data obtained by the scanner during the CT scan. In the present embodiment, the volumetric CT data set comprises scan data that is expected to be subject to some motion, for example a cardiac CT scan of a patient with a high heart rate. The scan is a CT scan of a patient's heart, in which a contrast agent has been used to enhance the intensity of blood. In other embodiments, no contrast agent is used. In some embodiments, no contrast agent is required in performing motion compensation.

For CT of the heart and/or angiography, contrast may be used. For other applications, such as lung airway, no contrast may be required. In some embodiments, volumetric MR scan data is used instead of the volumetric CT data set. Some MR angiography protocols (for example, dynamic contrast enhanced MR) may require contrast, whereas other protocols such as time-of-flight and non-contrast coronary sequences may not require contrast.

The volumetric CT data set may be captured within one heartbeat. The capture time may in some circumstances correspond to one rotation of a CT scanner gantry or a portion of the rotation of a CT scanner gantry. The portion of the rotation of the CT scanner gantry may be between a half and a full rotation, for example ⅔ of a rotation. In one embodiment, the scanner gantry rotation time is 275 ms and the capture time is ⅔ of a scanner gantry rotation time. In some embodiments, the capture time is the time taken to rotate through half a scanner gantry rotation plus an angle of the fan beam of the CT scanner.

The reconstruction unit 36 reconstructs multiple preliminary volumetric imaging data sets from the volumetric CT data set that has been received from scanner 14. The reconstruction unit 36 transforms the raw CT data of the volumetric CT data set into volumetric imaging data which comprises voxel intensities that are representative of the attenuation of X-rays at different points in space.

Each preliminary volumetric imaging data set is reconstructed from a respective part of the volumetric CT data set. Each preliminary volumetric imaging data set is a volumetric imaging data set which comprises an array of voxels, each with an associated intensity value in Hounsfield units (HU).

The multiple preliminary volumetric imaging data sets correspond to different time points around a target time point of clinical relevance. In the embodiment of FIG. 3, the reconstruction unit 36 reconstructs three preliminary volumetric imaging data sets: target phase data set T at the target time point, reference phase data set A at a time before the target time point, and reference phase data set B at a time after the time point.

At stage 50, the data receiving unit 24 receives the preliminary volumetric imaging data sets T, A and B and the segmentation unit 26 obtains a segmentation of coronary vessels from each of preliminary volumetric imaging data sets T, A and B. The segmentation unit 26 may obtain the segmentation of the coronary vessels using any segmentation method that is capable of segmenting vessel fragments. In the present embodiment, the segmentation method is a direct segmentation method that does not comprise vessel tracking. In the present embodiment, the segmentation method comprises an atlas-based segmentation of the heart followed by a Markov Random Field segmentation of the coronary vessels. The segmentation method used is described further below with reference to the flow chart of FIG. 4.

In each of the preliminary volumetric imaging data sets T, A and B, the segmentation of the coronary vessels that is obtained by the segmentation unit 26 is incomplete, due to motion artifacts. Discrete parts of the segmentation of the coronary vessels may be referred to as vessel fragments.

Tracking-based segmentation algorithms may comprise, for example, placing a seed point inside a vessel, which may be associated with an initial direction. The tracking-based segmentation algorithm may then search the local area to find points along the vessel, for example along a vessel centerline. Tracking-based segmentation algorithms may stop when an apparent gap in the vessel (for example, an apparent gap caused by a motion artifact) is reached. Such tracking-based segmentation algorithms may in some circumstances fail to find all vessel fragments. In some cases, a segmentation method that does not comprise vessel tracking (for example, a segmentation method that uses an atlas-based approach and/or a segmentation method that uses intensity thresholds without tracking along a vessel) may find more vessel fragments than a tracking-based segmentation method.

At stage 60, the line determination unit 28 determines centerlines for the segmentation of the coronary vessels in each of preliminary volumetric imaging data sets T, A and B. The centerline of the segmentation of the coronary vessels in target phase data set T may be referred to as a target phase line, and the centerline of the coronary vessels in each of reference phase data sets A and B may be referred to as a reference phase line. Since in each preliminary volumetric imaging data set the segmentation of the coronary vessels is incomplete, the centerlines for each segmentation have gaps corresponding to gaps in the segmentation of the coronary vessels.

In the present embodiment, the target phase line and reference phase lines are centerlines obtained by performing a medial axis transform on the segmentation of the coronary vessels. In other embodiments, any suitable method of obtaining a line along the segmentation of the vessels (which may or may not be a centerline) may be used. Each line may be continuous or may comprise a line of points. Each line may be branched (as may be the case for lines representative of coronary vessels).

The target phase line comprises at least one gap, which corresponds to at least one gap in the segmentation of the coronary vessels in target phase data set T. The reference phase lines also each comprise at least one gap, which may be different from the gap or gaps in the segmentation of target phase data set T. The gaps may be caused by motion artifacts.

The synthesis unit 30 determines a synthesized target phase line by combining the reference phase lines with the target phase line, thereby at least partly filling a gap or gaps in the target phase line. The synthesized target phase line is a line in the space of the target phase data set T. The original target phase line (as obtained by the line determination unit 28) is all retained in the synthesized target phase line. Where there are gaps in the target phase line (corresponding to gaps in the segmentation of the coronary vessels from the target phase data set T), the gaps in the target phase line are filled where possible using the reference phase line from A and/or the reference phase line from B.

The process of determining centerlines and combining the centerlines to determine a synthesized target phase line is described in further detail below with reference to the flow chart of FIG. 7.

At stage 70, the matching unit 32 matches the reference phase line from A and the synthesized target phase line, and matches the reference phase line from B and the synthesized target phase line. Any suitable matching process may be used that substantially preserves the length of the vessels. In the present embodiment, the matching unit 32 obtains matches the lines using a Markov Random Field (MRF) matching process. The effect of the matching process is that each reference phase line is registered to the synthesized target phase line. (We note that in a registration context, the target phase line is what may be referred to as a reference, and the reference phase lines may in that registration context be referred to as test or floating lines). The resulting transformation may be more sparsely defined than transformations using some other registration methods.

The motion estimation unit 34 uses the matching of the reference phase line from reference phase data set A and the synthesized target phase line to estimate the motion occurring between the time of reference phase data set A and the target time of target phase data set T. The motion estimation unit 34 uses the matching of the reference phase line from reference phase data set B and the synthesized target phase line to estimate the motion occurring between the target time of target phase data set T and the time of reference phase data set B. The motion estimation unit 34 expresses each motion estimate (one from the synthesized target phase line and the reference phase line from A, and one from the synthesized target phase line and the reference phase line from B) as a warp field (deformation field).

The matching of the lines and motion estimation is described below in further detail with reference to the flow chart of FIG. 12.

At stage 80, the reconstruction unit 36 performs a further reconstruction of the raw CT data of the volumetric CT data set to obtain a further data set. The reconstruction of the further data set is a reconstruction of all the volumetric CT data set from the full CT scan to obtain an array of voxels with associated intensity values. The motion information obtained at stage 70 is used to adjust the reconstruction geometry.

In the process of reconstruction, the reconstruction unit 36 uses the estimated motion warp fields from stage 70 to compensate for motion that occurred during the capture of the volumetric CT data set. The reconstruction using the estimated motion may be performed using, for example, the method of Tang et al, A combined local and global motion estimation and compensation method for cardiac CT, Proc. SPIE 9033, Medical Imaging 2014: Physics of Medical Imaging, 903304 (19 Mar. 2013).

The further data set is obtained from the same volumetric CT data set from which the preliminary volumetric imaging data sets were reconstructed at stage 40, but the further data set is reconstructed from the whole of the volumetric CT data set, while the preliminary volumetric imaging data sets were each reconstructed from a respective part of the volumetric CT data set.

It has been found that the method described above with reference to FIG. 3 may be used to produce reconstructed data sets with reduced motion artifacts. The method of FIG. 3 may provide an improved estimation of coronary artery motion. By reducing motion artifacts, it may be possible to improve image quality without increasing the speed of rotation of the CT scanner. For some CT systems, it may be possible to obtain good quality heart images at a higher heart rate than was previously possible. It may be possible to obtain good quality heart images in a shorter scan time (and hence a lower radiation dose) than may be obtained using methods that scan for multiple heart signals. It may be possible to obtain better quality images more often, which may mean that fewer scans may need to be performed. It may be possible to scan higher heart rate patients more successfully.

The method described in overview with reference to FIG. 3 is now described in greater detail with reference to FIGS. 4 to 16. Stages 40 to 80 are each described further. Stages 50 to 70 are each broken down into sub-stages for more detailed descriptions.

At stage 40 of FIG. 3, as has been described above, the reconstruction unit 36 reconstructs multiple preliminary volumetric imaging data sets T, A and B from the volumetric CT data set received from the CT scanner 14. The reconstruction unit 36 may use any appropriate reconstruction method, for example a back projection method (which may be a filtered back projection method). In other embodiments, the reconstructed preliminary volumetric imaging data sets T, A and B are received from the CT scanner 14 or from a data store or alternative unit and no reconstruction stage 40 is performed.

In the present embodiment, three preliminary volumetric imaging data sets (target phase data set T, and two reference phase data sets A and B) are reconstructed from the volumetric CT data. In other embodiments, any number of preliminary volumetric imaging data sets may be reconstructed from the volumetric CT data, each corresponding to a different time point. For example, a target phase data set and one, three, four or five reference phase data sets may be reconstructed from the volumetric CT data.

In the present embodiment, the volumetric data received from the scanner is volumetric CT data. In other embodiments, volumetric data of any suitable modality is received (for example, MR, PET, SPECT, X-ray or ultrasound) and the reconstruction unit 36 uses a reconstruction method suitable for reconstructing volumetric imaging data sets from data of the received modality.

The flow chart of FIG. 3 proceeds to stage 50. At stage 50, the data receiving unit 24 receives the target phase data set T and reference phase data sets A and B and the segmentation unit 26 obtains a segmentation of the coronary vessels in each of the received data sets. In other embodiments, the structures for which a segmentation is obtained from each of preliminary volumetric imaging data sets T, A and B may not be vessels. Each structure for which a segmentation is obtained may be any elongated structure of the body. The elongated structure may be for example, a tubular structure of the body. The elongated structure may be, for example, a vessel, a lumen or an airway. The elongated structure may be a bone, for example a long bone such as a rib or a femur, or the spine. Segmentation of an elongated bone may be relevant for orthopaedic applications.

Figure 4:
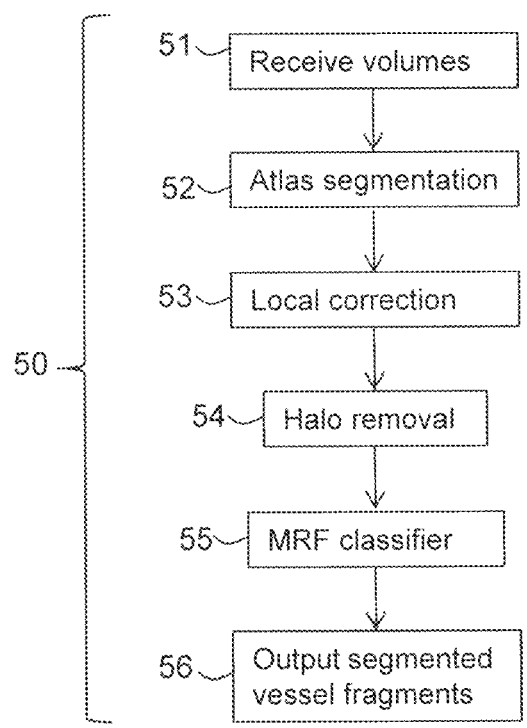
FIG. 4 is a flow chart illustrating in overview a segmentation process performed in accordance with an embodiment.

Stage 50 of FIG. 3 is broken down into sub-stages in the flow chart of FIG. 4. We turn to FIG. 4 to describe the sub-stages of stage 50 in order. FIG. 4 describes sub-stages 51 to 56 of stage 50. Sub-stages 51 to 56 are performed on each of preliminary volumetric imaging data sets T, A and B.

The description below provides details of sub-stages 51 to 56 being performed on target phase data set T, by way of example. Sub-stages 51 to 56 are also performed on reference phase data sets A and B.

At sub-stage 51 of FIG. 4, the data receiving unit 24 receives target phase data set T from the reconstruction unit 36. The data receiving unit 24 passes target phase data set T to the segmentation unit 26. In other embodiments, the data receiving unit 24 may receive target phase data set T from the CT scanner 14, from a data store, or from an alternative unit.

Target phase data set T comprises a plurality of voxels, each voxel having an intensity value and each voxels having a set of coordinates (for example, x, y, z coordinates) representing the spatial position with which the intensity value is associated.

At sub-stage 52 of FIG. 4, the segmentation unit 26 uses a multi-compartment atlas-based segmentation algorithm to identify a region in target phase data set T that includes the myocardium and coronary vessels.

The segmentation unit 26 performs a segmentation procedure to segment contrast-enhanced chambers of the heart and remove them from target phase data set T. The segmentation unit 26 identifies voxels belonging to the contrast-enhanced heart chambers. Removing the contrast-enhanced chambers from target phase data set T may comprise, for example, determining a subset in which the identified voxels are not included, or flagging the identified voxels so they are not used in further operations on the data set.

Any suitable segmentation procedure can be used to segment and remove the data representing the heart chambers. In the present embodiment, the segmentation procedure used is an atlas-based segmentation procedure. The atlas-based segmentation procedure is similar to that used in U.S. patent application Ser. No. 14/048,170, which is incorporated by reference. In some embodiments, the segmentation procedure used is a segmentation procedure as described in Murphy et al, International Journal of Computer Assisted Radiology and Surgery, Vol. 7, Issue 6, pp. 829-836, November 2012.

The atlas-based segmentation procedure of the present embodiment may be referred to as a multi-compartment segmentation procedure because multiple structures are identified in the segmentation procedure. In the present embodiment, the atlas-based segmentation procedure identifies the heart and thirteen associated structures by registering target phase data set T to an atlas data set. The associated structures are the left ventricle epicardium, the right ventricle epicardium, the left ventricle endocardium, the right ventricle endocardium, the left atrium with left auricle, the right atrium with right ventricle, the superior vena cava, the left inferior pulmonary vein, the left superior pulmonary vein, the right inferior pulmonary vein, the right superior pulmonary vein, the pulmonary trunk and the aortic root. In other embodiments, any other suitable segmentation may be used.

The segmentation unit 26 defines a subset of target phase data set T which comprises voxels representative of remaining regions of the heart that were not segmented using the atlas-based segmentation method. The remaining regions comprise the myocardium and coronary vessels. The subset may be referred to as a segmented myocardium and vessel region.

At sub-stage 53 of FIG. 4, the segmentation unit applies a local correction filter to the subset of target phase data set T to normalize background levels. In the present embodiment, the local correction filter is an unsharp mask filter. The unsharp mask filter has the effect of sharpening the vessels. In other embodiments, any suitable filter may be used. In some embodiments, no filter may be used, and sub-stage 53 may be omitted.

At sub-stage 54, the segmentation unit removes bright halos from the outside of the myocardium and vessel region (the myocardium and vessel region being the region represented by the subset of target phase data set T). The removal of bright halos may ensure that every voxel on the boundary of the myocardium and vessel region has a lower HU value than any neighboring voxel that is not on the boundary. Sub-stage 54 may have the effect of cleaning up debris from the outside of the segmented myocardium and vessel region. In other embodiments, no removal of bright halos may be performed, and sub-stage 54 may be omitted.

In further embodiments, alternative filters or morphological operations may be used instead of or in addition to sub-stages 53 and 54 of the present embodiment.

Sub-stages 51 to 54 result in a plurality of domains, where each domain is a set of voxels. In the present embodiment, each domain is a set of neighboring (and connected) voxels.

At sub-stage 55, the segmentation unit 26 classifies the domains that result from sub-stages 51 to 54. The segmentation unit 26 uses a combination of a logistic function and Markov Random Field spatial constraints to classify voxels as myocardium or as vessel. In the present embodiment, the MRF is formulated with a unary data term, which is a logistic function of voxel intensity, and a pairwise prior term with weights according to the ferromagnetic Ising model. A confidence enhanced iterated conditional modes (CEICM) optimizer is used. In other embodiments, any suitable MRF optimizer may be used, for example graph cuts or simulated annealing. The MRF method directly classifies the domains. In other embodiments, any suitable classification method may be used.

The segmentation unit 26 selects a further subset of voxels in target phase data set T. The further subset comprises all voxels that have been classified as belonging to the coronary vessels. The further subset may be referred to as a vessel subset of target phase data set T or as the segmentation of the coronary vessels in the target phase data set T. Where the volumetric imaging data is affected by motion, it may be expected that the vessel subset obtained from sub-stage 55 is representative of fragments of coronary vessels rather than complete vessels. At sub-stage 56, the segmentation unit 26 outputs the vessel subset of T to the line determination unit 28.

Sub-stages 51 to 56 are also performed on reference phase data sets A and B, to obtain a vessel subset of A (which may be referred to as a segmentation of the coronary vessels in reference phase data set A) and a vessel subset of volume B (which may be referred to as a segmentation of the coronary vessels in reference phase data set B).

Figure 5:
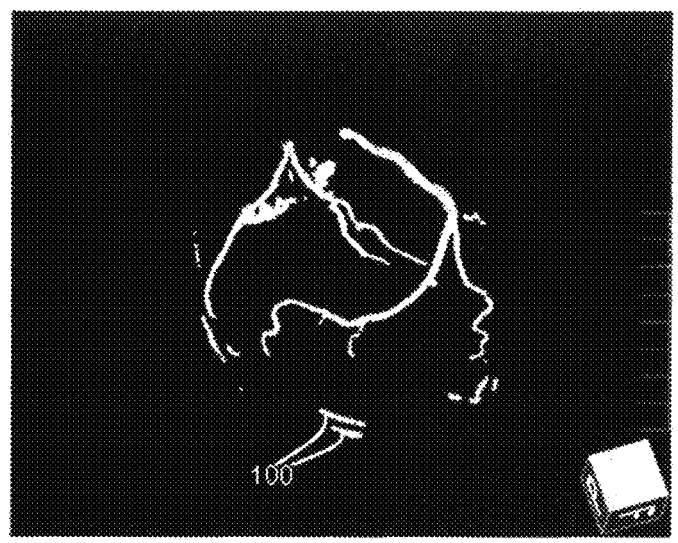
FIG. 5 is an image showing segmented vessels from a normal data set.

FIG. 5 shows a segmentation of coronary arteries that has been obtained from a reconstructed data set that does not have any substantial motion artifacts (this may be referred to as a normal or non-motion-affected data set). In the example of FIG. 5, a data set is reconstructed from volumetric CT data. The MRF segmentation method as described above with reference to FIG. 4 (comprising sub-stages 51 to 56) is applied to the reconstructed data set to obtain a vessel subset. The vessel subset is rendered to provide the image of FIG. 5.

For the data set of FIG. 5, the MRF segmentation method of FIG. 4 is found to pick up the larger coronary arteries reliably without the use of tracking. Some debris 100 remains from the atlas-based segmentation, but the debris is not connected to vessels.

Figure 6A:
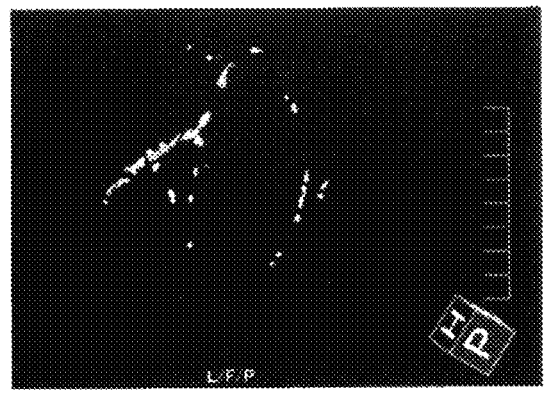
FIGS. 6a, 6b and 6c are images showing segmented vessels from three phases reconstructed from motion-affected scan data.
Figure 6B:
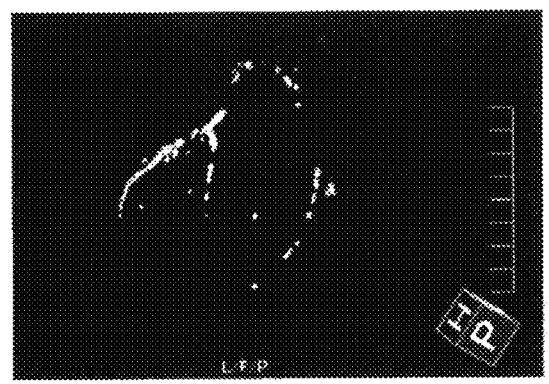
Figure 6C:
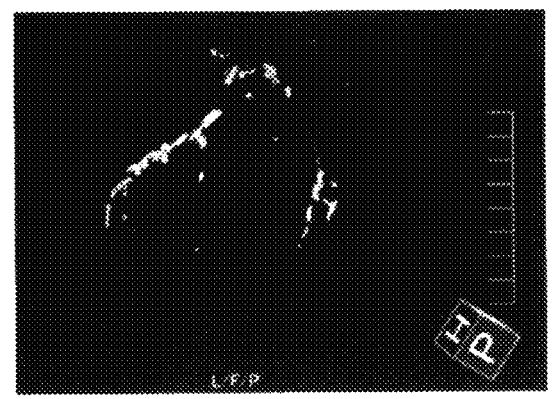

FIGS. 6A to 6C each show a segmentation of coronary arteries. Each segmentation has been obtained from a respective preliminary volumetric imaging data set that has been reconstructed from a badly motion-affected data set. In the example represented by FIGS. 6A to 6C, three preliminary volumetric imaging data sets (relating to three phases) are reconstructed from data from a single motion-affected scan, the three preliminary volumetric imaging data sets each being reconstructed at a different time point. The MRF segmentation method of FIG. 4 is applied to each of the preliminary volumetric imaging data sets to obtain a respective vessel subset for each preliminary volumetric imaging data set. Each vessel subset is then rendered to produce the images of FIGS. 6A to 6C.

It may be seen that the coronary vessels as represented in each of FIGS. 6A, 6B and 6C are fragmented. The rendered vessels are much less complete than those of FIG. 5. The motion which occurred within the scan of FIGS. 6A to 6C means that parts of the coronary vessels cannot be successfully segmented in each of the preliminary volumetric imaging data sets due to motion artifacts. The segmentation of each preliminary volumetric imaging data set results in different fragments of the same major vessels. For example, the vessels of FIG. 6A (as represented by the vessel subset) have gaps at different points from the vessels of FIG. 6B or from the vessels of FIG. 6C.

Sub-stage 56 completes stage 50 of FIG. 3. Returning to FIG. 3, the output of stage 50 is a respective segmentation of the coronary vessels in each of the target phase data set T, reference phase data set A and reference phase data set B. The process of FIG. 3 then proceeds to stage 60.

At stage 60 of FIG. 3, the synthesis unit determines a synthesized tree using the segmentation of each of preliminary volumetric imaging data sets T, A and B. Segmented vessel fragments for each phase (as shown in FIGS. 6A to 6C) are used to create a more complete representation of the vessels in one phase (in this case, the target phase, represented by target phase data set T). In the present embodiment, three incomplete vessel segmentations are combined into one more complete representation (in the present embodiment, by determining and combining centerlines). The result of the tree synthesis process of stage 60 may represent all vessel fragments that are common to at least two phases.

Figure 8:
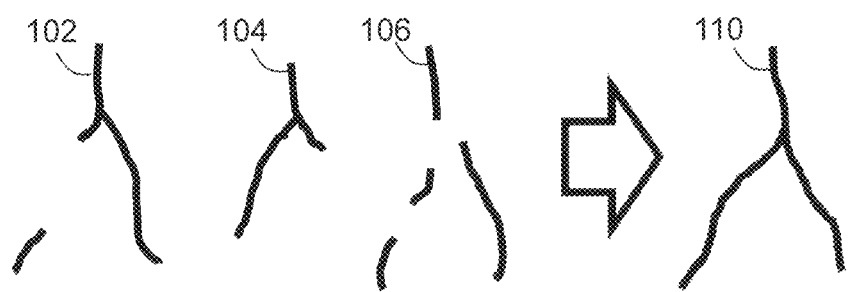
FIG. 8 is a schematic illustration of a tree synthesis process.
Figure 9:
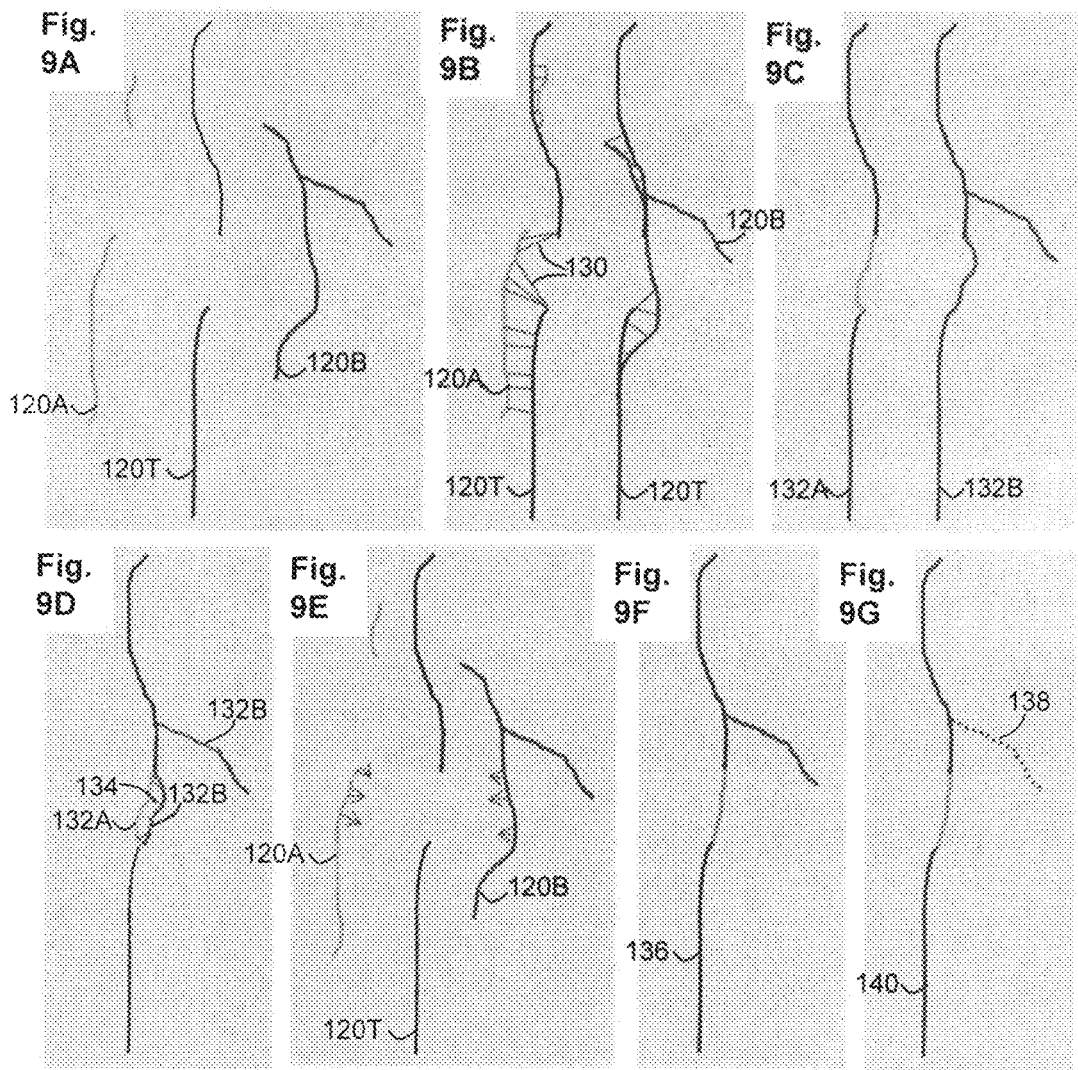
FIGS. 9a to 9g illustrate in overview a set of stages involved in tree synthesis.

A basic schematic illustration of the synthesis process is shown in FIG. 8. Incomplete vessel representations 102, 104 and 106 may be combined to give a more complete vessel representation 110.

Stage 60 is now described further with reference to the flow chart of FIG. 7 and FIGS. 9A to 9G. Stage 60 may be broken into sub-stages 61 to 66, which are shown in the flow chart of FIG. 7.

Figure 7:
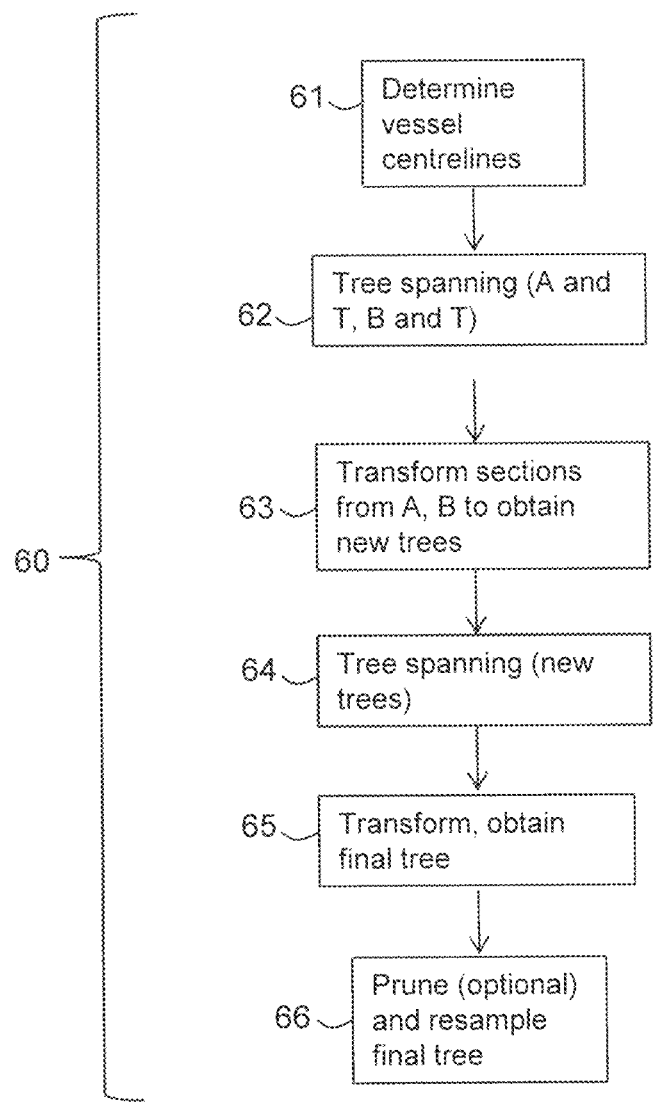
FIG. 7 is a flow chart illustrating in overview a tree synthesis process performed in accordance with an embodiment.

Turning to FIG. 7, at sub-stage 61, the line determination unit 28 extracts a medial axis from the vessel subset determined for target phase data set T by performing a medial axis transform on the vessel subset. The vessel subset comprises voxels that have been classified as being part of the coronary vessels. The line determination unit 28 uses the extracted medial axis to create a vessel centerline for the parts of the coronary vessel that are present in the vessel subset of target phase data set T. Similarly, the line determination unit 28 extracts a medial axis from the vessel subset of reference phase data set A and from the vessel subset of reference phase data set B, to create vessel centerlines.

In other embodiments, any appropriate method of determining centerlines (or any other line representative of the path of the vessel) may be used.

In the discussion below, reference is made to gaps in the vessel centerlines. In some embodiments, the gaps in the vessel centerlines are represented as actual breaks in the centerlines. In other embodiments, a gap in a centerline may be a part of the centerlines that represents a gap in the vessel segmentation from which the centerline is derived. A gap in a centerline may be a part of the centerline which is to be ignored in further sub-stages of the tree synthesis process.

Vessel centerlines 120 of the present embodiment are shown schematically in FIG. 9A. The centerline for target phase data set T is indicated by 120T, the centerline for A by 120A and the centerline for B by 120B. It may be noted that each of the centerlines has different missing sections.

The drawings of FIG. 9A to FIG. 9G are schematic and in practice more vessels may be present and each vessel may have a large number of breaks, dividing each vessel into a number of fragments. Therefore the centerlines 120 may have more branches and many more gaps. For each preliminary volumetric imaging data set, the centerline 120 may comprise many disconnected centerline components.

In FIG. 9A the centerlines 120A, 120B, 120T are shown as being offset from each other for clarity. In practice, parts of the centerlines 120A, 120B, 120T may be overlaid or nearly overlaid in space, since the centerlines are all representative of the same vessels.

At sub-stage 62, the synthesis unit 30 performs a tree spanning process to create two multi-phase sets of trees, one through centerlines 120A and 120T and the other through centerlines 120B and 120T. The tree spanning process is described below with reference to centerlines 120B and 120T, as an example, with reference to the schematic diagram of FIG. 10. In the present embodiment, the tree spanning process is also performed for centerlines 120A and 120T. In embodiments having a greater number of reference phase data sets, the tree spanning process is performed to match each reference phase line with the target phase line.

For each of centerlines 120B and 120T, a tree is defined, the tree comprising a set of nodes and edges. Different edges are given different weights. The cost of an edge in the target phase is the Euclidean distance of that edge. The cost of an edge in the reference phase (in this example, in reference phase data set B) is much higher.

The synthesis unit 30 performs a tree spanning process on the trees of 120B and 120T using a 4D minimum spanning forest algorithm. In the present embodiment, the synthesis unit 30 applies a spanning tree algorithm based on Prim's algorithm to find spanning trees in four dimensions, where the fourth dimension represents the time difference between reference phase data set B and target phase data set T. Any other suitable tree spanning process may be used in alternative embodiments.

The spanning tree algorithm finds the optimal spanning tree using the best components from all phases. The spanning tree algorithm traverses the target phase tree until it reaches a gap. If the gap is a small gap 124 then the small gap 124 is spanned directly in the target phase (see FIG. 10). If the gap is a large gap 122 then the large gap 122 is spanned by traversing a different phase (in FIG. 10, phase B). The cost of edges between phases is also the Euclidean distance.

The algorithm may produce many short branches 126 into other phases that never return to the target phase. Such branches may be removed in a post-processing step at the end of sub-stage 62.

The algorithm is run multiple times for the trees from target phase data set T and from reference phase data set B to obtain one spanning tree per connected component (a spanning forest). Although we refer to individual trees or centerlines below, each data set may comprise many vessel fragments and so may comprise many connected components. Each data set may be representative of both left and right coronary arteries, which will not be connected to each other. Each operation that is described below as being performed on an individual tree or centerline may be performed on each tree or centerline in each data set.

In the present embodiment, the 4D minimum spanning forest algorithm used in the matching process is based on Prim's algorithm, with candidate edges up to 10 pixels in each axis. Prim's algorithm is a minimum spanning tree algorithm. In other embodiments, a different minimum spanning tree algorithm is used, for example Kruskal's algorithm.

The tree spanning process determines a route through an elongated structure or set of elongated structures (for example, a vessel or set of vessels) in different phases. In other embodiments, any suitable process may be used to determine a route through elongated structure or set of elongated structures in different phases.

The same tree spanning process is performed on trees from centerlines 120A and 120T as is described above for trees from centerlines 120B and 120T.

FIG. 9B is a schematic representation of sub-stage 62. The tree spanning process is applied to trees from centerlines 120A and 120T, and trees from centerlines 120B and 120T.

Two multi-phase sets of spanning trees, one set from A and T and one set from B and T, are produced. At sub-stage 63, for each multi-phase set of spanning trees, each point from the non-target phase (A or B) in the set of spanning trees is mapped to its new position in T, using thin plate splines calculated from the traversed trees. The mapping is shown in FIG. 9B, in which the centerlines for A and T and for B and T are linked by short lines 130 that are representative of mapping by thin plate splines. The thin plate splines act to merge parts of the centerlines for A into the centerline for T, and to merge parts of the centerlines for B into the centerline for T, such that there is no discontinuity between the centerlines of A and T, and the centerlines of B and T. Any other suitable smoothing or fitting algorithm may be used in place of a thin plate spline algorithm. In some embodiments, a B-spline algorithm is used.

The result of the mapping is two new sets of trees: one containing edges from A and T and the other containing edges from B and T. In each set of trees, the edges from T remain the same as they were originally, but the edges from the respective reference phase (A or B) have been mapped into the space of T by the thin plate spline mapping.

Figure 10:
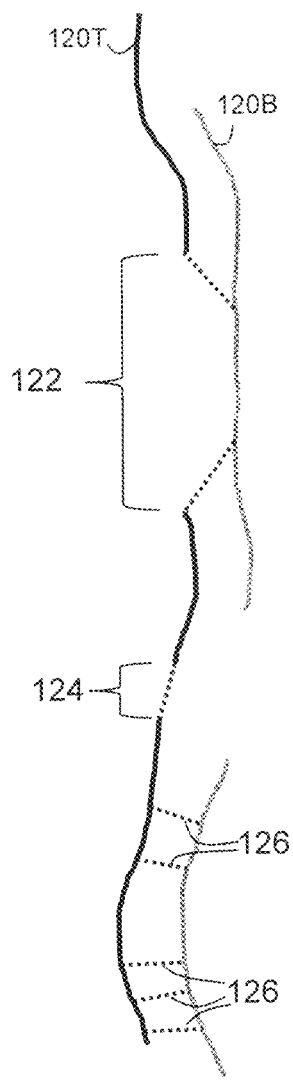
FIG. 10 is a schematic illustration of a tree synthesis process.

In the new sets of trees there are no discontinuities between the phases. See, for example, FIG. 10. In FIG. 10, changing from centerline 120T to centerline 120B across gap 122 results in a discontinuity in the resulting line. By mapping the relevant part of 120B to 120T using thin plate splines, a line may be obtained that does not exhibit such a discontinuity.

The line determination unit 28 converts the new sets of trees to domains. Each line segment (section between two points on a line) on each centerline is converted to a narrow cylinder. The union of the narrow cylinders for the segments of the centerlines gives a domain representation of the centerlines. Domains are groups of voxels forming connected regions. The union of the narrow cylinders may resemble a narrower version of the original vessel segmentations obtained at stage 50.

The line determination unit 28 recomputes the medial axes, using the domains corresponding to the new sets of trees. The recomputed medial axes are referred to as 132A and 132B below. Converting to domains and recomputing the medial axes may remove labels from the centerlines and resolve sections where the two matched lines almost but don't exactly overlap.

The medial axes 132A, 132B from the new sets of trees for A and T and for B and T are illustrated schematically in FIG. 9C. Medial axes 132A and 132B are offset for clarity in FIG. 9C.

At sub-stage 64, the synthesis unit 30 uses the medial axes 132A and 132B computed from the new sets of trees (the new trees being from A and T, and from B and T) and performs a further tree spanning process. The further tree spanning process is performed to match trees derived from medial axes 132A and 132B.

Medial axis 132B comprises some sections derived from T, which have not been transformed and remain substantially as they were in the original centerline 120T. In some embodiments, some minor adjustments may be made to the sections from T, for example when the medial axes are recomputed.

Medial axis 132B further comprises sections derived from centerline 120B. Such sections have been transformed according to the thin plate splines determined at sub-stage 63 (and may have been further adjusted when the medial axes were recomputed).

Similarly, medial axis 132A comprises some substantially untransformed sections for T (which will be substantially the same as centerline 120T) and some sections from centerline 120A that have been transformed according to the thin plate splines determined at sub-stage 63.

132A may be the same as, or similar to, 132B in sections that have come from T. 132A may differ from 132B in sections where gaps in T have been filled by sections from A and/or filled by sections from B.

The synthesis unit 30 uses a cost function to traverse the new trees of 132A and 132B.

At sub-stage 65, the synthesis unit 30 computes a further set of thin plate splines which relate the new trees of 132A and 132B. However, this time the thin plate splines have only half of the normal displacement. This is because, for sections where 132A and 132B differ (which may be sections for which no tree in T was available, because T is preferred in constructing both 132A and 132B), a path between 132A and 132B is taken.

FIG. 9D shows 132A and 132B, which may be seen to be overlaid along most of their length, since all the sections derived from T are common to 132A and 132B. In the region in which 132A and 132B differ, lines 134 represent the further set of thin plate splines (in fact the lines 134 represent the full displacement, whereas the thin plate splines have half the full displacement).

The synthesis unit 30 transforms the original medial axis transforms (centerlines 120A and 120B as obtained at sub-stage 61) of the vessel subset from A and the vessel subset from B with the thin plate splines determined at sub-stage 63. The synthesis unit 30 then transforms the resulting lines with the further thin plate splines determined at sub-stage 65. The transformation with the further thin plate splines transforms the lines to the midpoint between the spaces of the trees of 132A and 132B. Sections of the trees that were present originally in both reference phase data set A and reference phase data set B (but not in target phase data set T) are made to overlap.

FIG. 9E represents centerlines 120A and 120E being transformed according to thin plate splines into the space of T. 120A, 120B and 120T are offset for clarity. The transformation of A and B results in a combined tree.

The result of applying the medial axis transforms and further medial axis transforms is that each of trees A and B is transformed to give a transformed tree. The transformed trees are traversed along with the original T phase, to give a tree that contains all of the available vessel segments from all three trees (A, B and T) mapped into the space of T. The resulting tree 136 is illustrated in FIG. 9F. This stage ensures that each part of the resulting tree is correctly labeled for sub-stage 66.

At sub-stage 66, the synthesis unit 30 prunes the medial axis 136 that was obtained in sub-stage 65 to remove branches that were present in centerlines 120A or 120B but were not present in centerline 120T. The pruning of the medial axis may be considered to be an optional step. In other embodiments, the medial axis is not pruned.

The synthesis unit 30 resamples the medial axis 136 so that points are densely distributed along it. The final, resampled medial axis may be referred to as synthesized target phase line 140. Synthesized target phase line 140 is illustrated in FIG. 9G. A removed branch 138 is indicated by a dotted line in FIG. 9G.

The output of sub-stage 66 is the synthesized target phase line 140 in the space of target phase data set T, which may have been pruned to remove branches not present in T. The synthesized target phase line 140 comprises sections from A and B that fill missing sections from T. The synthesized target phase line 140 is more complete than the target phase line (centerline 120T) that was determined at sub-stage 61.

Although the above description describes the process for a single tree and single synthesized target phase line, the process of FIG. 7 is carried out for each connected component.

Turning again to the flow chart of FIG. 3, the output of stage 60 is the synthesized target phase line or lines 140.

Although stage 60 is described above as being performed on three different preliminary volumetric imaging data sets that are reconstructed from the same scan, in other embodiments tree synthesis may be performed on data sets that are reconstructed from different scans, for example scans taken at different points in time. In some circumstances, better results may be achieved for data that is representative of points that are closer in time than for data that is representative of points that are far apart in time.

The segmentation method of stage 50 and tree synthesis of stage 60 may in some circumstances be more robust to motion than tracking-based segmentation methods (the segmentation method of stage 50 is a direct segmentation method that does not comprise tracking). Motion artifacts can cause the tracking algorithm to stop prematurely if it cannot track past an artifact. Thus, sections of tracked artery may be short and incomplete.

Figure 11A:
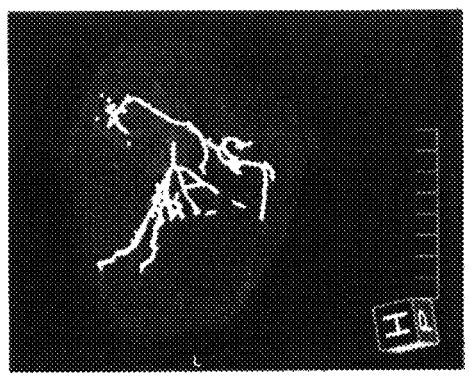
FIGS. 11a to 11c illustrate results of automatic vessel segmentation and tree synthesis.
Figure 11B:
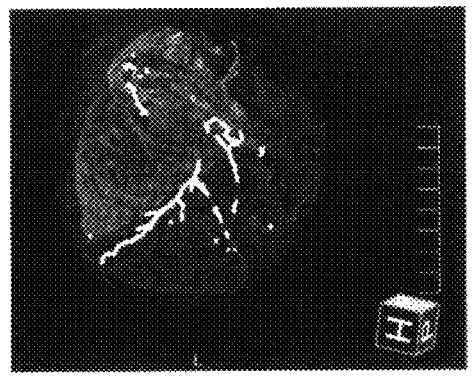
Figure 11C:
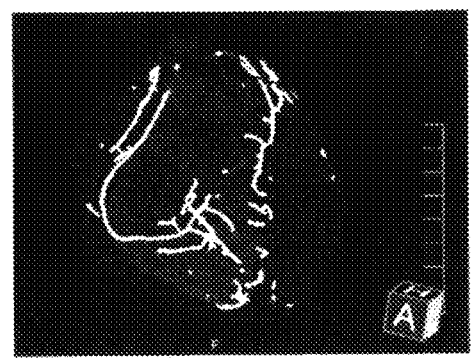

The automatic segmentation method of stage 50 and tree synthesis of stage 60 may identify more of the coronary arteries than some tracking-based methods and do not require a seed point. Some results of the segmentation method of stage 50 and tree synthesis of stage 60 are illustrated in FIGS. 11a, 11b and 11c. The automatic segmentation method of stage 50 may be able to segment disconnected fragments of vessel. The tree synthesis of stage 60 may allow fragments from different phases to be combined.

Returning to the flow chart of FIG. 3, at the end of stage 60 the synthesis unit has obtained at least one synthesized target phase line 140. The process of FIG. 3 then proceeds to stage 70.

At stage 70, the synthesized target phase line 140 and the centerlines 120A, 120B for the segmented vessel fragments from each reference phase are used to estimate motion between phases. Centerlines 120A and 120B are each matched with the synthesized target phase line 140. The matching of centerline 120A and the synthesized target phase line 140 is used to determine a first local warp field relating reference phase data set A and target phase data set T. The matching of centerline 120B and the synthesized target phase line 140 is used to determine a second local warp field relating reference phase data set B and target phase data set T.

The discussion below with regard to stage 70 discusses a single synthesized target phase line 140 in the space of target phase data set T and a centerline 120A of vessel fragments. The process of stage 70 may be carried out for each synthesized target phase line 140 where there are disconnected synthesized target phase lines 140 (for example, where there are gaps in the centerline 120T of the segmented vessels in target phase data set T that could not be filled by centerlines 120A and 120B).

Figure 12:
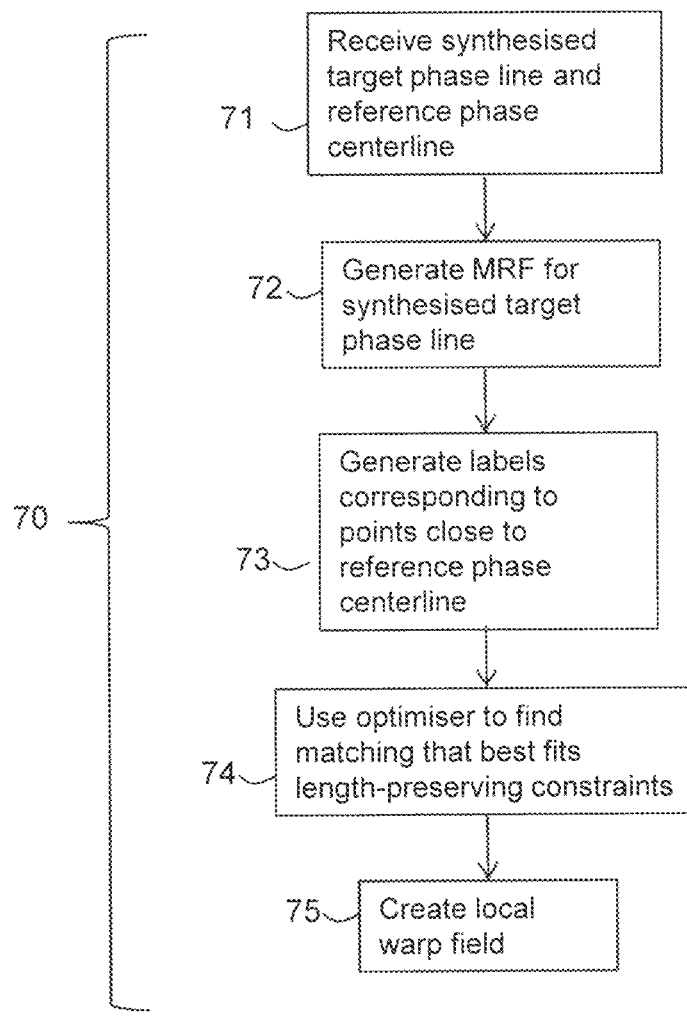
FIG. 12 is a flow chart illustrating in overview a Markov Random field vessel matching process performed in accordance with an embodiment.

Stage 70 may be broken into sub-stages 71 to 75, which are shown in the flow chart of FIG. 12. Sub-stages 71 to 75 are now described with reference to centerline 120A. Sub-stages 71 to 75 are also performed for centerline 120B.

At sub-stage 71, the matching unit 32 receives the synthesized target phase line 140 from the synthesis unit 30. The matching unit 32 receives the centerline 120A of reference phase data set A from the line determination unit 28. Centerline 120A may be representative of a number of vessel fragments, and may comprise a number of gaps.

At sub-stage 72, the matching unit 32 generates a Markov Random Field with nodes 150 along the synthesized target phase line 140. In some cases, the position of the nodes 150 may correspond to voxel positions. In other cases, the position of the nodes 150 may not correspond to voxel positions. For example, positions that are not voxel positions may be interpolated. In some embodiments, the nodes 150 may be equally spaced along the line in at least one dimension.

At sub-stage 73, the matching unit 32 generates a plurality of labels. Each label corresponds to a point 152 on or close to centerline 120A. Points 152 are pseudorandomly generated to be positioned at different distances from centerline 120A and at different spacings along the length of centerline 120A. Many more points 152 than nodes 150 may be generated by the matching unit 32.

Figure 13:
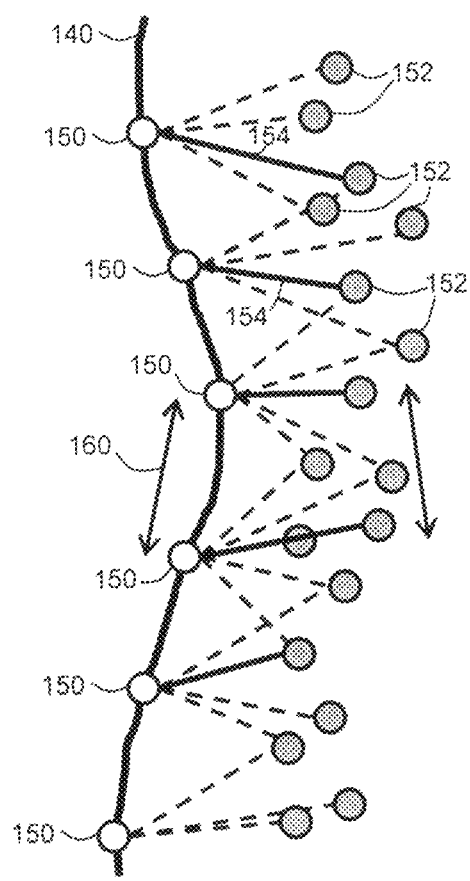
FIG. 13 is a schematic illustration of a Markov Random Field vessel matching.

FIG. 13 is a schematic illustration of a set of nodes 150 along a synthesized phase line 140 and a set of points 152 on or near a reference phase line 120A (the reference phase line 120A is not shown in FIG. 13). It may be seen that in the diagram of FIG. 13, nodes 150 are spaced at intervals along the synthesized reference line 140. One such interval is indicated by arrow 160. Many more points 152 than nodes 150 are provided, and points 152 do not all lie on the reference phase line 120A but may be placed at a small distance from reference phase line 120A as determined by a pseudorandom generator.

By generating more points than there are originally points on the centerline 120A, quantization errors may be reduced. The centerline 120A may originally be defined in terms of points that are, for example, 1 unit apart. The synthesized target phase line 140 may also be defined in terms of nodes that are 1 unit apart. In such a situation, it may be unlikely that a one-to-one matching of nodes and points will result in the best matching, since it may be likely that some nodes of the synthesized target phase line would be better matched to intermediate locations on the centerline 120A. By providing a greater number of points, the likelihood of a better match is increased.

At sub-stage 74, an optimizer is used to find the matching of nodes 150 and labels that best fits a given set of constraints. In the present embodiment, the optimizer used is an iterated conditional modes (ICM) optimizer. In other embodiments, any suitable optimizer may be used.

Each node 150 can take many of the possible labels. A further special label is used for unmatched nodes 150. Some nodes 150 may remain unmatched if, for example, they represent parts of the synthesized target phase line for which no corresponding part of centerline 120A is available.

The set of constraints used by the optimizer comprises spatial constraints. The spatial constraints are defined such that lengthwise distortion of vessels is minimized, while allowing lateral movement. The optimizer optimizes a cost function which depends on lengthwise distances. The separation between successive points may stay almost the same.

In the present embodiment, the spatial constraints are stored in the matching unit 32 and are the same for every matching process that is performed. In other embodiments, spatial constraints may be input or edited, or may be stored in a different unit.

Figures 14A, 14B:
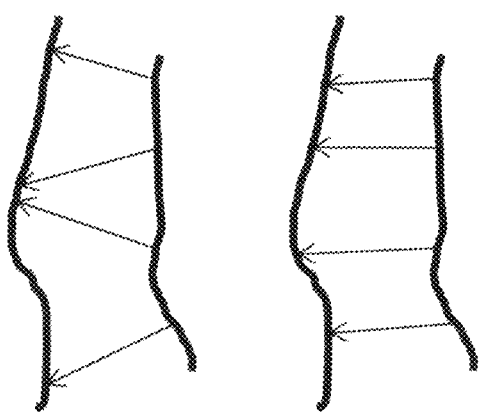
FIG. 14a illustrates a matching in which vessels are distorted lengthwise.
FIG. 14b illustrates a matching in which there is no significant vessel distortion.

FIGS. 14*a* and 14*b* represent vessel matching with and without lengthwise distortion.

In some matching and registration procedures, it is possible to match points on one line to nodes on another without consideration of length (for example, without considering whether the spacing of the points along one line is the same as the spacing of the nodes along another). The matching of points to nodes without consideration of length is illustrated in FIG. 14*a*. The structure being matched, for example the vessel in this embodiment, may be significantly distorted by such a matching. FIG. 14*b* represents a matching or registration in which length is substantially preserved, and there is little lengthwise distortion.

If vessels are allowed to be distorted lengthwise in matching, such distortion may result in poor quality motion estimates. By limiting the amount of lengthwise distortion, a better estimate of motion may be obtained than would be obtained if substantial lengthwise distortion of vessels were allowed.

The MRF matching of the synthesized target phase line 140 and the centerline 120A can only find matchings for points that exist on the line on which the nodes are defined (which may be called the target tree in the context of MRF matching, and in this case is the synthesized target phase line 140).

If MRF matching were to be performed using the target phase centerline 120T as the target tree for the matching, it would only be possible to perform matching for points that exist in the target phase centerline 120T. It would not be possible to match points that exist in the reference phase centerline 120A but not in the target phase centerline 120T. By instead using the synthesized target phase line 140 as the target tree for the matching, points may be matched even when they are not present in the target centerline 120T.

The result of the MRF matching is a registration from the reference phase data set to the target phase data set.

The matched nodes resulting from sub-stage 74 represent local displacements (shown on FIG. 13 as arrows 154) between the synthesized target phase line 140 and the reference phase centerline 120A. At sub-stage 75, the motion estimation unit 34 uses the matched nodes to create a first local warp field (deformation field) via smoothing.

The first local warp field may be merged with a global warp field from an earlier stage. The global warp field may be derived from an initial non-rigid registration between preliminary volumetric imaging data sets A and T.

Sub-stages 71 to 75 of the flow chart of FIG. 12 are also performed on synthesized target phase line 140 and centerline 120B to obtain a second local warp field. The second local warp field may be merged with a global warp field from an earlier stage. The global warp field may be derived from an initial non-rigid registration between preliminary volumetric imaging data sets B and T.

Each local warp field may be considered to be a motion estimate. The first local warp field (obtained from synthesized target phase line 140 and reference phase centerline 120A) is an estimate of motion between the time of reference phase data set A and the time of target phase data set T. The second local warp field (obtained from the synthesized target phase line 140 and reference phase centerline 120B) is an estimation of motion between the time of target phase data set T and the time of reference phase data set B.

The output of sub-stage 75 of FIG. 12 is the first local warp field and second local warp field. By determining a first and second local warp field in the region of the coronary arteries, in some circumstances motion estimates may be improved when compared with motion estimates that only use global results, for example motion estimates obtained using a global registration between preliminary volumetric imaging data sets A and T and a global registration between preliminary volumetric imaging data sets B and T without local refinement around the coronary arteries.

Turning again to FIG. 3, the output of stage 70 is the first local warp field and second local warp field. The process of FIG. 3 then proceeds to stage 80.

At stage 80, the reconstruction unit 36 uses the first and second local warp fields to reconstruct a new volumetric imaging data set from the volumetric CT data set. The first and second local warp fields each comprise an estimate of motion. In the present embodiment, the reconstruction unit 36 reconstructs the new volumetric image data set using the reconstruction method described in Tang et al, A combined local and global motion estimation and compensation method for cardiac CT, Proc. SPIE 9033, Medical Imaging 2014: Physics of Medical Imaging, 903304 (19 Mar. 2013). The reconstruction method of Tang et al incorporates the estimated motion in the reconstruction. In other embodiments, any suitable reconstruction method in which motion is incorporated may be used.

The new volumetric imaging data set is a data set from which some motion effects have been removed. Some motion artifacts may be reduced when compared with motion artifacts in at least one of the reconstructed preliminary volumetric imaging data sets A, B and T. For example, fewer motion artifacts may be present in the new volumetric imaging data set than in the target phase data set T, or the severity of motion artifacts may be reduced when compared with those in target phase data set T.

By using vessel segmentation and tree synthesis to estimate motion in a CT scan, motion artifacts in the resulting reconstructed data may be reduced. Reduction in motion artifacts may allow good CT images to be obtained at increased heart rates. It may in some circumstances be possible to obtain improved quality of CT data without having to increase the speed of rotation of the CT gantry. In some circumstances, high quality images may be obtained with a reduced scan time and radiation dose compared to approaches which use multiple heart beats.

It may in some circumstances be possible to obtain a better registration of coronary arteries using the segmentation process of stage 50 of FIG. 3 and the tree synthesis process of stage 60 of FIG. 3 and the vessel matching process of stage 70 of FIG. 3 than may be obtained by registering images directly, for example using mutual information.

In the above embodiment, the process of FIG. 3 was used to segment and match coronary vessels from a cardiac CT scan. In other embodiments, part or all of the process of FIG. 3 may be used for further medical imaging applications. Part or all of the process of FIG. 3 may be used in any medical imaging application in which images at multiple time points are acquired or may be reconstructed.

In one embodiment, the vessel matching process of stage 70 is used to match coronary vessels in computational CT-FFR (computed tomography fractional flow reserve imaging).

Conventional FFR (Fractional Flow Reserve) is an invasive method of measuring stenosis in a vessel. In CT-FFR, computational fluid dynamics is used to determine pressure before and after a stenosis from a non-invasive CT scan.

In CT-FFR, it may be the case that vessels segmented from data sets may be relatively complete. Therefore it may not be necessary to perform tree synthesis in some CT-FFR cases. However, the matching process of stage 70 (comprising Markov Random Field matching of nodes on one vessel centerline and points on or near another vessel centerline) may be used to match vessels between data sets, for example across different phases.

In another embodiment, any of the segmentation of stage 50, the tree synthesis of stage 60 and the matching of stage 70 may be performed on airways, imaging of the lung and other parts.

In further embodiments, one or more stages of the process of FIG. 3 may be used for MR coronary segmentation and tracking. In other embodiments, one or more stages of the process of FIG. 3 may be used for any appropriate imaging modality.

In embodiments, any of the segmentation of stage 50, the tree synthesis of stage 60 and the tree matching of stage 70 may be used in performing multiphase liver vasculature segmentation.

Particular units have been described herein. In some embodiments functionality of one or more of these units can be provided by a single processing resource or other component, or functionality provided by a single unit can be provided by two or more processing resources or other components in combination. Reference to a single unit encompasses multiple components providing the functionality of that unit, whether or not such components are remote from one another, and reference to multiple units encompasses a single component providing the functionality of those units.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical imaging data processing apparatus, comprising:
processing circuitry configured to
receive a target phase data set and a reference phase data set, wherein the target phase data set and the reference phase data set are representative of a region of a patient at different times;
obtain a segmentation of an elongated structure in the target phase data set and obtain a segmentation of the elongated structure in the reference phase data set;
determine a target phase line along the segmentation of the elongated structure in the target phase data set and to determine a reference phase line along the segmentation of the elongated structure in the reference phase data set, and
determine a synthesized target phase line by combining at least part of the target phase line and at least part of the reference phase line to form the synthesized target phase line.

2. The apparatus according to claim 1, wherein the elongated structure comprises at least one blood vessel, and each segmentation of the elongated structure obtained by the processing circuitry comprises a plurality of segmented vessel fragments.

3. The apparatus according to claim 1, wherein, in the combining of the target phase line and reference phase line, the processing circuitry is further configured to perform a tree spanning process based on the target phase line and the reference phase line to obtain the synthesized target phase line.

4. The apparatus according to claim 1, wherein, in the combining of the target phase line and reference phase line, the processing circuitry is further configured to at least partly fill a spatial gap in the target phase line with said at least part of the reference phase line.

5. The apparatus according to claim 4, wherein the processing circuitry is further configured to adjust said at least a part of the reference phase line to merge into the target phase line.

6. The apparatus according to claim 5, wherein the processing circuitry is further configured to perform said adjusting of said at least a part of the reference phase line in accordance with at least one of a smoothing algorithm, a thin plate spline algorithm, and a B-spline algorithm.

7. The apparatus according to claim 1, wherein the processing circuitry is further configured to perform a matching of the reference phase line and the synthesized target phase line.

8. The apparatus according to claim 7, wherein the processing circuitry is further configured to perform the matching by performing:
determining a set of nodes along the synthesized target phase line;
determining a set of labels, the labels corresponding to points along the reference phase line and points near the reference phase line; and
matching nodes to labels using an optimizing algorithm, thereby to match the reference phase line and target phase line.

9. The apparatus according to claim 8, wherein the optimizing algorithm performed by the processing circuitry comprises spatial constraints such that longitudinal distortion along the length of at least one of the synthesized target phase line and the reference phase line is at least one of minimized and constrained.

10. The apparatus according to claim 7, wherein the processing circuitry is further configured to obtain an estimate of motion between the reference phase data set and target phase data set in dependence on the matching of the reference phase line and the synthesized target phase line.

11. The apparatus according to claim 10, wherein the processing circuitry is further configured to reconstruct a further data set from a volumetric scan data set in dependence on the estimate of motion.

12. The apparatus according to claim 11, wherein the processing circuitry is further configured to reconstruct the target phase data set, the reference phase data set, and the further data set from a same volumetric scan data set.

13. The apparatus according to claim 1, wherein the processing circuitry is further configured to obtain the segmentation of the elongated structure in the target phase data set and obtain the segmentation of the elongated structure in the reference phase data set using an atlas-based segmentation method.

14. The apparatus according to claim 1, wherein the processing circuitry is further configured to obtain the segmentation of the elongated structure in the target phase data set and obtain the segmentation of the elongated structure in the reference phase data set using a direct segmentation method.

15. The apparatus according to claim 1, wherein the processing circuitry is further configured to obtain the segmentation of the elongated structure in the target phase data set and obtain the segmentation of the elongated structure in the reference phase data set using a segmentation method based on direct classification by a Markov Random Field method.

16. The apparatus according to claim 1, wherein the processing circuitry is further configured to determine the target phase line, which comprises a centerline of the segmentation of the elongated structure in the target phase data set and determine the reference phase line, which comprises a centerline of the segmentation of the elongated structure in the reference phase data set.

17. The apparatus according to claim 1, wherein the processing circuitry is further configured to receive at least one further reference phase data set representative of the region of the patient at a further time,
obtain a segmentation of the elongated structure in the at least one further reference phase data set;
determine at least one further reference phase line along the segmentation of the elongated structure in the at least one further reference phase data set; and
in the combining of the target phase line and reference phase line to determine the synthesized target phase line, further combine with the at least one further reference phase line.

18. The apparatus according to claim 17, wherein the reference phase data set received by the processing circuitry is representative of the region of the patient at a first time, the target phase data set is representative of the region of the patient at a second time, and the further reference phase data set is representative of the region of the patient at a third time, and the second time is after the first time and before the third time.

19. A medical imaging data processing method, comprising:

receiving a target phase data set and a reference phase data set, wherein the target phase data set and the reference phase data set are representative of a region of a patient at different times;

obtaining a segmentation of an elongated structure in the target phase data set and obtaining a segmentation of the elongated structure in the reference phase data set;

determining a target phase line along the segmentation of the elongated structure in the target phase data set and determining a reference phase line along the segmentation of the elongated structure in the reference phase data set; and determining a synthesized target phase line by combining the target phase line and reference phase line to form the synthesized target phase line.

* * * * *